United States Patent
Kita et al.

(10) Patent No.: US 7,465,899 B2
(45) Date of Patent: Dec. 16, 2008

(54) WIRE ELECTRIC DISCHARGE MACHINE

(75) Inventors: Yuki Kita, Yamanashi (JP); Ryou Nishikawa, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 75 days.

(21) Appl. No.: 11/802,904

(22) Filed: May 25, 2007

(65) Prior Publication Data

US 2007/0278190 A1    Dec. 6, 2007

(30) Foreign Application Priority Data

May 30, 2006    (JP)    ............................ 2006-149776

(51) Int. Cl.
*B23H 7/02*    (2006.01)
*B23H 1/10*    (2006.01)

(52) U.S. Cl. ................. 219/69.12; 219/69.14

(58) Field of Classification Search ............ 219/69.12, 219/69.14; 340/584; 210/421
See application file for complete search history.

(56) References Cited

U.S. PATENT DOCUMENTS

| | | | | |
|---|---|---|---|---|
| 4,730,094 A | * | 3/1988 | Aramaki et al. | .......... 219/69.14 |
| 4,857,688 A | * | 8/1989 | Aso et al. | ................ 219/69.14 |
| 5,150,102 A | * | 9/1992 | Takashima | ................... 340/584 |
| 2007/0175814 A1 | * | 8/2007 | Kita et al. | .................... 210/421 |

FOREIGN PATENT DOCUMENTS

| | | | | |
|---|---|---|---|---|
| JP | 62-203725 A | * | 9/1987 |
| JP | 63-120038 | | 5/1988 |
| JP | 6-106424 A | * | 4/1994 |
| JP | 08-174339 | | 7/1996 |
| JP | 9-57541 A | * | 3/1997 |

* cited by examiner

*Primary Examiner*—Geoffrey S Evans
(74) *Attorney, Agent, or Firm*—Staas & Halsey LLP

(57) ABSTRACT

A wire electric discharge machine capable of maintaining machining-fluid temperature in a machining tank uniformly, even when the state of machining changes, for example between rough machining and finish machining. A first temperature sensor for detecting the machining-fluid temperature in a clean-fluid tank is provided to the clean-fluid tank or a machining-fluid cooling device. A second temperature sensor for detecting the machining-fluid temperature in the machining tank is provided. On the basis of machining conditions, etc., a controller of the wire electric discharge machine selects the second temperature sensor in machining producing much heat such as rough machining, and selects the first temperature sensor in machining producing little heat such as finish machining. The machining-fluid cooling device performs cooling control on the machining fluid in the clean-fluid tank based on the temperature detected by the selected temperature sensor.

5 Claims, 5 Drawing Sheets

1 …

WIRE ELECTRIC DISCHARGE MACHINE

CROSS REFERENCE TO RELATED APPLICATIONS

This application claims the benefit of Japanese Patent Application 2006-149776 filed May 30, 2007, in the Japanese Patent Office, the disclosure of which is hereby incorporated by reference.

BACKGROUND OF THE INVENTION

1. Field of the Invention

The present invention relates to a wire electric discharge machine, and particularly to temperature control of machining fluid being used in the wire electric discharge machine.

2. Description of Related Art

The wire electric discharge machine machines a workpiece by producing electric discharges by applying a voltage between a wire electrode and the workpiece. For insulation between the wire electrode and the workpiece, cooling, and removal of swarf produced by electric discharges, it is arranged such that machining fluid is intervened between the wire electrode and the workpiece. The electric discharges between the wire electrode and the workpiece heat the machining fluid, namely cause a rise in temperature of the machining fluid. Also heat loss of a pump for supplying the machining fluid to a machining tank with the workpiece placed in, etc. causes a rise in temperature of the machining fluid.

This temperature rise of the machining fluid causes thermal expansion deformation of the workpiece, a table on which the workpiece is mounted, etc., which causes lowering of the machining accuracy and breaking of the wire electrode. Thus, the wire electric discharge machine is provided with a cooling device for cooling the machining fluid.

FIG. 6 is a schematic block diagram showing a function of controlling the temperature of the machining fluid on the basis of a machining-fluid temperature in a clean-fluid tank, adopted in a conventional wire electric discharge machine.

In FIG. 6, reference numeral 1 denotes mechanical unit of the wire electric discharge machine. A table on which a workpiece to be machined is mounted is placed in a machining tank 2 disposed on the mechanical unit 1, and a wire electrode (not shown) is arranged to run within the machining tank 2. Electric discharge machining is performed by moving the table by means of feed servomotors, etc. included in the mechanical unit 1 and producing electric discharges by applying a voltage between the workpiece and the wire electrode. The machining tank 2 stores machining fluid. The machining fluid heated by electric discharges and containing swarf flows out of the machining tank 2 and is collected and held in a contaminated-fluid tank 3. The machining fluid in the contaminated-fluid tank 3 is pumped up by a pump P1 provided for filtering, passed through a filter F, and supplied to and held in a clean-fluid tank 4.

The machining fluid in the clean-fluid tank 4 is pumped up through a machining-fluid supply line L1a by a pump P3 provided for circulation. The machining-fluid supply line branches at the discharge port of the pump P3 so that the machining fluid is supplied to the machining tank 2 through a machining-fluid supply line L1b, and also introduced to a machining-fluid cooling device 6. To the clean-fluid tank 4 or the machining-fluid cooling device 6, a temperature sensor S1 for detecting the temperature of the machining fluid in the clean-fluid tank 4 is provided. On the basis of the temperature detected by the temperature sensor S1, the machining-fluid cooling device 6 performs temperature control to cool the machining fluid to a determined temperature. The machining fluid cooled is returned to the clean-fluid tank 4 through a machining-fluid return line L1c.

Further, a pump P2 provided for spouting pumps up the machining fluid from the clean-fluid tank 4 through a machining-fluid supply line L2a, and supplies it to upper and lower wire guides 5 through a machining-fluid supply line L2b so that the machining fluid is spouted from nozzles provided to the respective wire guides 5 to a space between the workpiece and the wire electrode (see JP 8-174339A).

There is also known machining-fluid treatment in which the machining-fluid temperature is controlled on the basis of the machining-fluid temperature in the machining tank, as shown in FIG. 7. A temperature sensor S2 for detecting the temperature of the machining fluid in the machining tank 2 is provided to the machining tank 2, and the machining-fluid temperature in the clean-fluid tank 4 is controlled by pumping up the machining fluid from the clean-fluid tank 4 by means of a pump P3, subjecting it to cooling control by the machining-fluid cooling device 6, on the basis of the temperature detected by the temperature sensor S2, and returning it to the clean-fluid tank 4. In the other respects, the configuration is the same as that of the example shown in FIG. 6 (see JP 63-120038A).

In the conventional example shown in FIG. 6, the machining fluid held in the clean-fluid tank 4 is controlled to a determined temperature by the machining-fluid cooling device 6. The machining fluid is, however, supplied to the machining tank 2 and the upper and lower guides 5 (note that the machining fluid is supplied to a space between the wire electrode and the workpiece, via upper and lower wire guides 5), through the pump P3 for circulation and the pump P2 for spouting. Thus, the machining fluid supplied is at a temperature raised due to heat loss of the pumps P3 and P2. Further, the machining fluid in the machining tank 2 is heated by electric discharges between the wire electrode and the workpiece, so that it is at a raised temperature, or in other words, uncontrolled in temperature. Thus, the temperature of the machining fluid in the machining tank 2 is higher than the temperature of the machining fluid in the clean-fluid tank 4 which is controlled in temperature, and the temperature in the machining tank 2 varies depending on the state of machining.

FIG. 8 shows how the machining-fluid temperature in the machining tank varies in rough machining and finish machining, under the machining-fluid temperature control in the conventional example shown in FIG. 6. In FIG. 8, time is plotted on the horizontal axis and the machining-fluid temperature in the machining tank is plotted on the vertical axis. The target temperature for the machining-fluid temperature control by the machining-fluid cooling device 6 is indicated in dashed line. In the rough machining, the amount of heat produced by machining and heat due to the pumps is great, so that the machining-fluid temperature in the machining tank 2 is higher than the target temperature, although the machining-fluid temperature in the clean-fluid tank 4 is controlled to the target temperature by the machining-fluid cooling device 6. Meanwhile, in the finish machining, heat is hardly produced by machining and heat due to the pumps is little, so that a difference between the machining-fluid temperature in the machining tank 2 and that in the clean-fluid tank 4 is very small, or in other words, the machining-fluid temperature in the machining tank 2 is controlled almost to the target temperature. This leads to a drawback that there is produced a step in machining-fluid temperature in the machining tank, between the rough machining and the finish machining.

In the machining-fluid temperature control system in the conventional example shown in FIG. 7, the machining-fluid temperature in the machining tank 2 is detected and controlled to follow the target temperature. Thus, the problem of influence of machining heat and heat due to the pumps P2, P3 is obviated, and the machining-fluid temperature control can be performed uniformly from rough machining to finish machining, in spite of a change in machining state. There is, however, a problem that in the finish machining, the band of variation of the temperature is broad.

FIG. 9 shows how the machining-fluid temperature detected in the machining tank 2 varies in rough machining and finish machining, in the system shown in FIG. 7 in which the machining-fluid temperature in the machining tank 2 is detected and the machining-fluid temperature in the clean-fluid tank 4 is cooling-controlled by the machining-fluid cooling device 6. As seen from FIG. 9, in the finish machining, the band of variation of the machining-fluid temperature in the machining tank 2 is broader, compared with the control system shown in FIG. 6 (compared with the variation shown in FIG. 8).

The cause of this phenomenon is thought to be that the machining-fluid temperature in the machining tank 2 is controlled by detecting the temperature in the machining tank 2, cooling the machining fluid in the clean-fluid tank 4 and supplying this cooled machining fluid to the machining tank.

In the rough machining, much heat is produced by machining, so that the machining-fluid temperature in the machining tank 2 rises at a high rate. When the machining-fluid temperature in the machining tank 2 detected by the temperature sensor S2 rises beyond the target temperature for the temperature control by the machining-fluid cooling device 6, to a cooling start temperature, the machining-fluid cooling device 6 starts cooling the machining fluid in the clean-fluid tank 4. The machining fluid pumped up from the clean-fluid tank 4 is cooled, then returned to the clean-fluid tank 4 and mixed, so that the machining-fluid temperature gradually drops. The machining fluid gradually dropping in temperature is put into the machining tank 2, and due to a temperature difference between the machining fluid in the machining tank 2 and the machining fluid in the clean-fluid tank 4, the machining-fluid temperature in the machining tank 2 drops. Then, when the machining-fluid temperature detected by the temperature sensor S2 drops below the lower target temperature to the lower limit of the temperature control, the temperature control by the machining-fluid cooling device 6 is deactivated, so that the cooling of the machining fluid in the clean-fluid tank 4 is stopped. Thus, after this, the machining fluid fixed in temperature is put into the machining tank 2. This supply of the machining fluid fixed in temperature tends to drop the machining-fluid temperature in the machining tank 2, while the heat produced by machining warms the machining fluid. Thus, when the rate at which the machining-fluid temperature rises due to the heat produced by machining exceeds the rate at which the temperature drops due to the machining fluid from the clean-fluid tank 4, the machining-fluid temperature starts rising. This process is repeated, so that the machining-fluid temperature is held close to the target temperature, repeating a rise and drop with a short period, as shown in FIG. 9.

Meanwhile, in the finish machining, machining produces little heat. Thus, the machining-fluid cooling device 6 starts cooling the machining fluid in the clean-fluid tank 4, namely causes its temperature to drop gradually, the machining fluid dropped in temperature is put into the machining tank 2, and due to a temperature difference between the machining fluid in the machining tank and the machining fluid in the clean-fluid tank 4, also the machining-fluid temperature in the machining tank 2 drops. Then, when the machining-fluid temperature that has reached the lower limit of the temperature control is detected by the temperature sensor S2, the machining-fluid cooling operation of the machining-fluid cooling device 6 is stopped, so that the machining-fluid temperature in the clean-fluid tank 4 stops dropping and held at a fixed temperature. Since this machining fluid in the clean-fluid tank 4 is put into the machining tank 2, the machining-fluid temperature in the machining tank 2 still continues dropping, due to a temperature difference between the machining fluid in the machining tank 2 and the machining fluid in the clean-fluid tank 4. Since in the finish machining, machining produces little heat, the machining-fluid temperature in the machining tank 2 drops to almost the same level as the machining-fluid temperature in the clean-fluid tank 4, and accordingly, the rate at which the machining-fluid temperature in the machining tank drops due to the temperature difference between the machining fluid in the clean-fluid tank 4 and the machining fluid in the machining tank 2 decreases. When the rate at which the machining-fluid temperature rises due to the heat produced by finish machining exceeds this temperature drop rate, the machining-fluid temperature in the machining tank 2 rises. In the finish machining, this process is repeated. Thus, as seen from FIG. 9, the cycle of rise and drop of the machining-fluid temperature in the machining tank 2 is longer, the band of variation of the temperature is broader, and there is produced a step in temperature between the rough machining and the finish machining. In other words, in the finish machining, the average of the machining-fluid temperature in the machining tank is lower than the target temperature for the machining-fluid cooling device 6 and different from that in the rough machining. Further, in the finish machining, the band of variation of the temperature is broad, which means low stability.

SUMMARY OF THE INVENTION

The present invention provides a wire electric discharge machine with a temperature control function capable of maintaining temperature of machining fluid in a machining tank uniformly, even with a change in machining state.

A wire electric discharge machine of the present invention performs electric discharge machining according to machining conditions and has a machining tank in which the electric discharge machining is performed, a contaminated-fluid tank storing machining fluid collected from the machining tank, a clean-fluid tank storing machining fluid sent from the contaminated-fluid tank through a filter and a machining-fluid supply line for supplying the machining fluid from the clean-fluid tank to upper and lower wire guides in the machining tank. According to an aspect of the present invention, the wire electric discharge machine comprises: a machining-fluid cooling device for cooling the machining fluid from the clean-fluid tank and supplying the cooled machining fluid to the clean-fluid tank; first temperature detecting means for detecting temperature of the machining fluid in the clean-fluid tank; second temperature detecting means for detecting temperature of the machining fluid in the machining tank; and selecting means for selecting one of the first temperature detecting means and the second temperature detecting means in dependence on the machining conditions, wherein the machining-fluid cooling device controls the cooling of the machining fluid based on a target temperature and the temperature detected by the selected one of the first temperature detecting means and the second temperature detecting means.

The selecting means may select the first temperature detecting means when performing finish machining, and selects the second temperature detecting means when performing rough machining.

The selecting means may select the first temperature detecting means if a set value of the flow rate of the machining fluid to be spouted from nozzles at the upper and lower wire guides is not greater than a predetermined value when performing finish machining, and selects the second temperature detecting means when performing rough machining and if the set value of the flow rate of the machining fluid is greater than the predetermined value when performing the finish machining.

The selecting means may select the first temperature detecting means if a set value of the flow rate of the machining fluid to be spouted from nozzles at the upper and lower wire guides is not greater than a predetermined value, and selects the second temperature detection means if the set value of the flow rate is greater than the predetermined value.

According to another aspect of the present invention, the wire electric discharge machine comprises: a machining-fluid cooling device for cooling the machining fluid from the clean-fluid tank and supplying the cooled machining fluid back to the clean-fluid tank; first temperature detecting means for detecting temperature of the machining fluid in the clean-fluid tank; second temperature detecting means for detecting temperature of the machining fluid in the machining tank; and selecting means for selecting the first temperature detecting means when a difference between a target temperature and an average of the temperature detected by the second temperature detecting means is within a predetermined range, and selecting the second temperature detecting means when the difference is not within the predetermined range, wherein the machining-fluid cooling device controls the cooling of the machining fluid based on the target temperature and the temperature detected by the selected one of the first temperature detecting means and the second temperature detecting means.

Even when the machining conditions are changed, the machining-fluid temperature in the machining tank can be maintained almost uniformly. Thus, thermal deformation of a workpiece and a table to which the workpiece is fitted, caused by variations in temperature of the machining fluid, can be suppressed, machining accuracy can be improved, and breaking of the wire electrode can be prevented.

DETAILED DESCRIPTION

Figure 1:
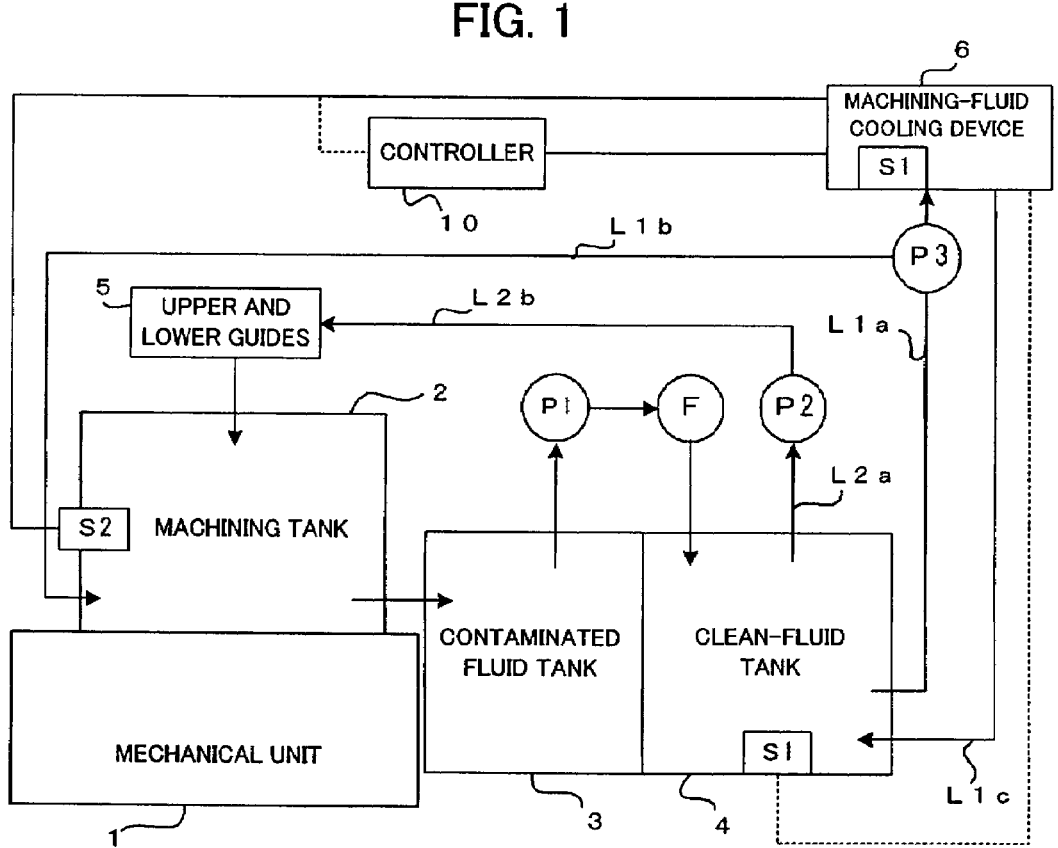
FIG. 1 is a schematic block diagram showing machining-fluid treatment according to an embodiment of the present invention.

FIG. 1 is a schematic block diagram showing machining-fluid temperature control in an embodiment of the present invention. It is to be noted that the same elements as those in the conventional examples are denoted by the same reference signs.

Like the conventional examples, a machining tank 2 is fitted to a mechanical unit 1 of a wire electric discharge machine, and an electric discharge machining part is disposed within the machining tank 2. Specifically, a workpiece to be machined is mounted on and fitted to a table connected to the mechanical unit 1, and electric discharge machining is performed on the workpiece by producing electric discharges by applying a voltage between the workpiece and an wire electrode (not shown), while moving the workpiece relatively to the wire electrode. The machining fluid is supplied to and held in the machining tank 2. The machining fluid in the machining tank 2 contains swarf, etc. produced by electric discharges, and flows out to a contaminated-fluid tank 3.

The machining fluid collected and held in the contaminated-fluid tank 3 is pumped up by a pump P1 provided for filtering, passed through a filter F, by which swarf, etc. are removed, and supplied to a clean-fluid tank 4.

The machining fluid held in the clean-fluid tank 4 is pumped up through a machining-fluid supply line L1a by a pump P3 provided for circulation. The machining-fluid supply line branches at the discharge port of the pump P3 so that the machining fluid is supplied to the machining tank 2 through a machining-fluid supply line L1b, and also supplied to a machining-fluid cooling device 6, cooled and then returned to the clean-fluid tank 4 through a machining-fluid return line L1c.

To the clean-fluid tank 4 or the machining-fluid cooling device 6, there is provided a temperature sensor S1, which functions as a first temperature detection means for detecting the temperature of the machining fluid in the clean-fluid tank 4 or the machining fluid pumped up from the clean-fluid tank 4 to the machining-fluid cooling device 6. Also the machining tank 2 is provided with a temperature sensor S2, which functions as a second temperature detection means for detecting the temperature of the machining fluid in the machining tank 2. Receiving a command signal from a controller 10 of this wire electric discharge machine, the machining-fluid cooling device 6 cools the machining fluid to a determined temperature, on the basis of the machining-fluid temperature detected by the first temperature sensor S1 or the second temperature sensor S2 and returns the machining fluid to the clean-fluid tank 4 through the machining-fluid return line L1c.

A pump P2 provided for spouting pumps up the machining fluid from the clean-fluid tank 4 through a machining-fluid supply line L2a and supplies to upper and lower wire guides 5 through a machining-fluid supply line L2b. The upper and lower guides 5 spout the machining fluid to a space between the wire electrode and the workpiece by means of nozzles provided to the respective wire guides, thereby cooling the space and removing swarf produced by electric discharges from the space.

The characteristic feature of the present invention lies in that the temperature control on the machining fluid by the machining-fluid cooling device 6 is performed choosing between the machining-fluid temperature detected by the first temperature sensor S1 and the machining-fluid temperature detected by the second temperature sensor S2, depending on the state of wire electric discharge machining.

Figure 9:
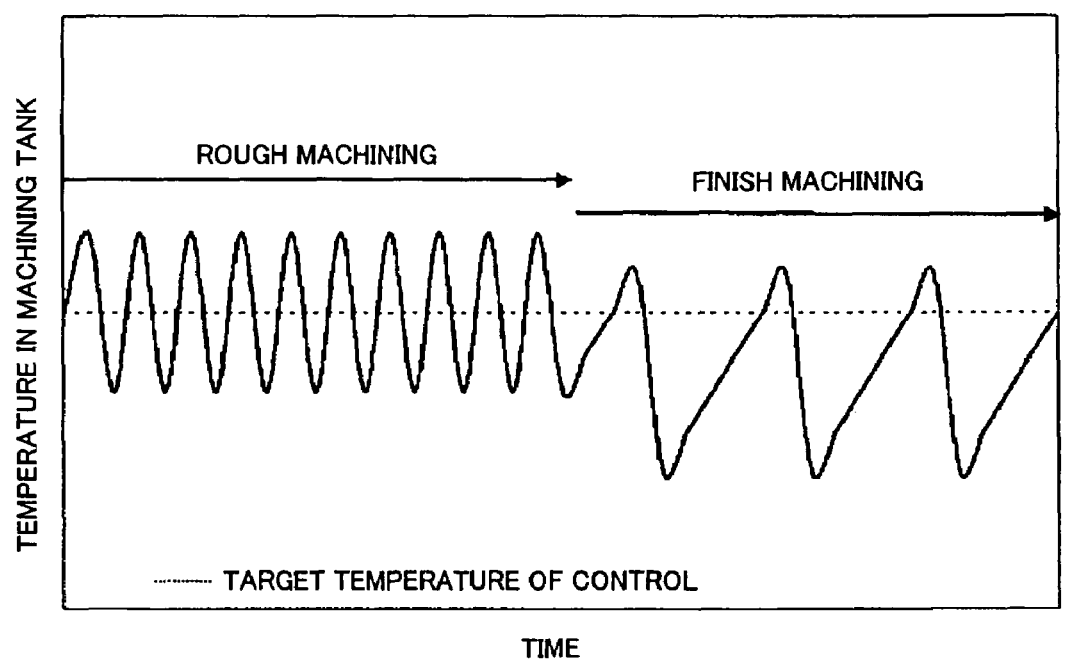
FIG. 9 is a diagram showing how the machining-fluid temperature in the machining tank varies in rough machining and finish machining in the conventional example in which the machining-fluid temperature is controlled on the basis of the machining-fluid temperature in the machining tank.

In rough machining in which machining produces much heat, if the machining-fluid cooling device 6 controls the machining-fluid temperature in the clean-fluid tank 4 on the basis of the machining-fluid temperature in the machining tank 2 detected by the second temperature sensor S2, the machining-fluid temperature in the machining tank 2 can be controlled to almost agree with a target temperature as shown in FIG. 9.

Figure 5:
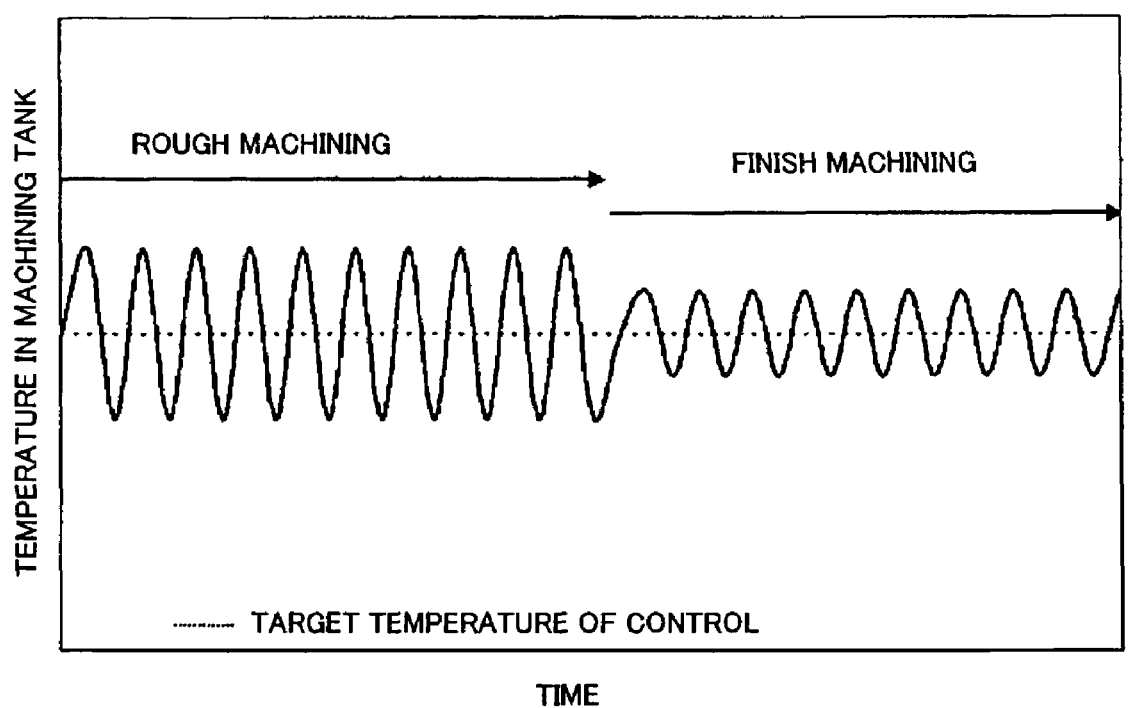
FIG. 5 is a diagram showing how the machining-fluid temperature in the machining tank varies in rough machining and finish machining in each embodiment of the present invention.
Figure 6:
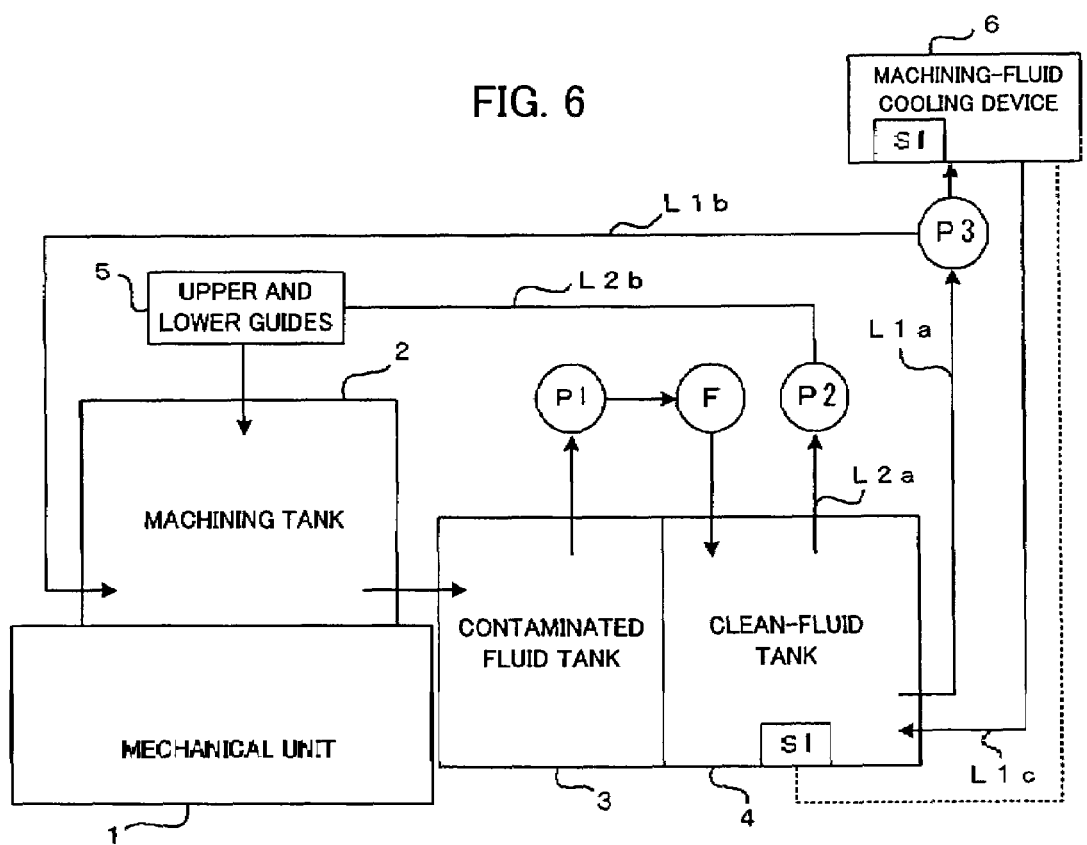
FIG. 6 is a schematic block diagram showing a conventional example in which the machining-fluid temperature is controlled on the basis of the machining-fluid temperature in the clean-fluid tank.
Figure 7:
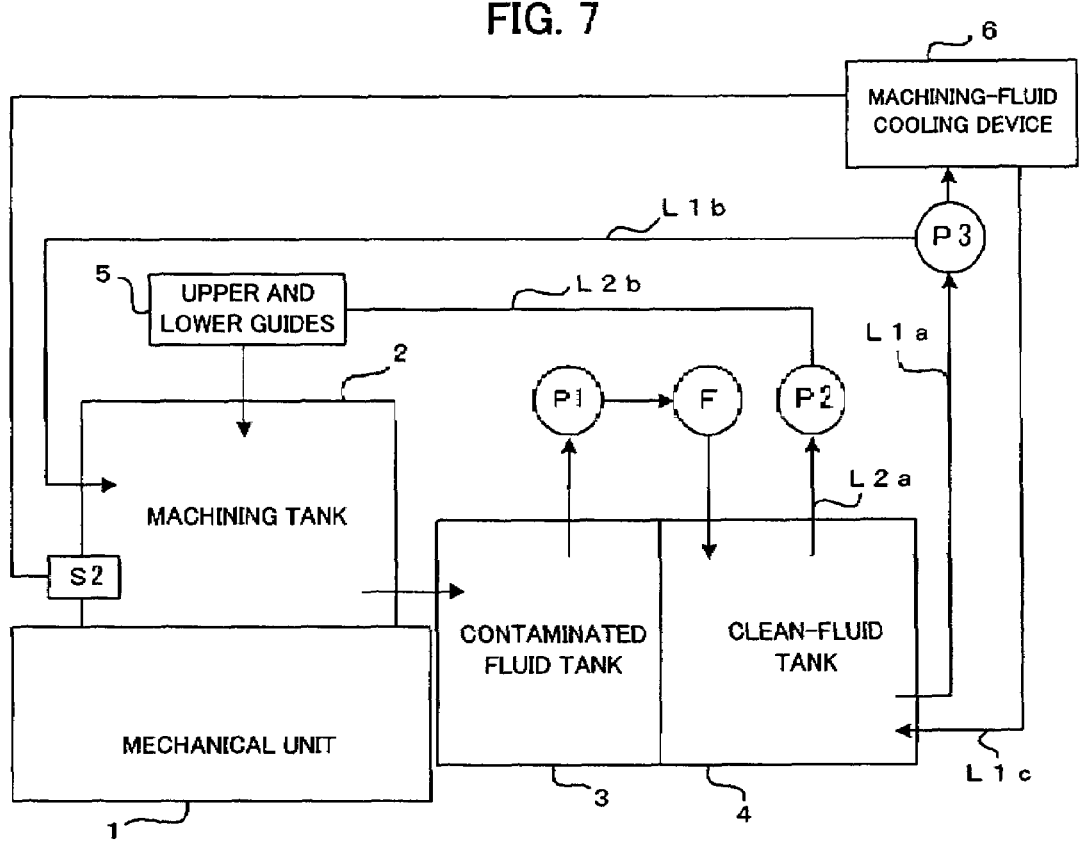
FIG. 7 is a schematic block diagram showing a conventional example in which the machining-fluid temperature is controlled on the basis of the machining-fluid temperature in the machining tank.
Figure 8:
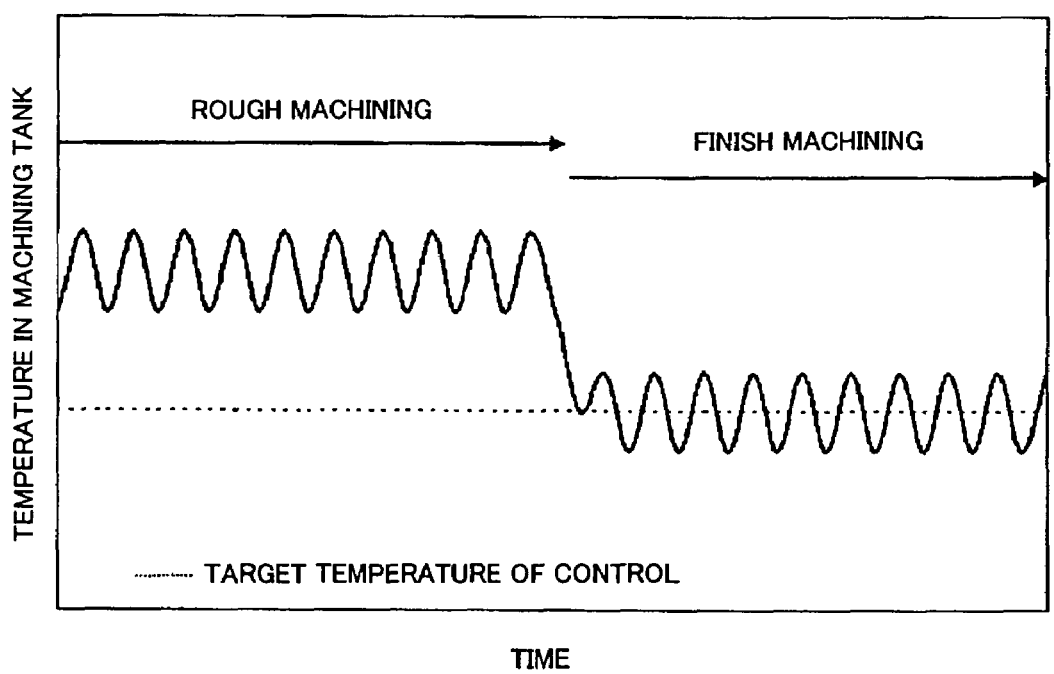
FIG. 8 is a diagram showing how the machining-fluid temperature in the machining tank varies in rough machining and finish machining in the conventional example in which the machining-fluid temperature is controlled on the basis of the machining-fluid temperature in the clean-fluid tank.

Meanwhile, in finish machining in which machining produces little heat, if the machining-fluid cooling device 6 controls the machining-fluid temperature in the clean-fluid tank 4 on the basis of the machining-fluid temperature in the clean-fluid tank 4 detected by the first temperature sensor S1, the machining-fluid temperature in the machining tank 2 can be controlled to almost agree with a target temperature and have a narrow variation band as shown in FIG. 8. Thus, the present invention is arranged such that in the rough machining, the machining-fluid cooling device 6 performs temperature control on the basis of the machining-fluid temperature detected by the second temperature sensor S2, and in the finish machining, on the basis of the machining-fluid temperature detected by the first temperature sensor S1, so that the machining-fluid temperature in the machining tank can be maintained at the target temperature, uniformly, as shown in FIG. 5.

Although the temperature sensor on which the machining-fluid temperature control relies may be selected depending on whether the machining is rough machining or finish machining as mentioned above, basically it is selected depending on the amount of heat produced by machining, which is large in rough machining and small in finish machining. Thus, even in finish machining, if the machining conditions are such that produces a large amount of heat, the temperature control is performed on the basis of the machining-fluid temperature detected by the second temperature sensor, as in the rough machining.

When the machining produces a larger amount of heat, the temperature control on the machining fluid is more difficult, which results in a greater difference between the machining-fluid temperature in the machining tank and the target temperature. Thus, it may be arranged such that when a difference between the average of machining-fluid temperature in the machining tank 2 detected by the second temperature sensor and the target temperature is greater than or equal to a determined value (this value is determined depending on the accuracy of machining and the capacity of the machining-fluid cooling device 6; ±0.5° C., for example), the control is performed using the detected temperature fed from the second temperature sensor S2 for detecting the machining-fluid temperature in the machining tank 2, and when not, using the detected temperature fed from the first temperature sensor disposed in the clean-fluid tank 4 or the machining-fluid cooling device 6 for detecting the machining-fluid temperature in the clean-fluid tank 4.

Figure 2:
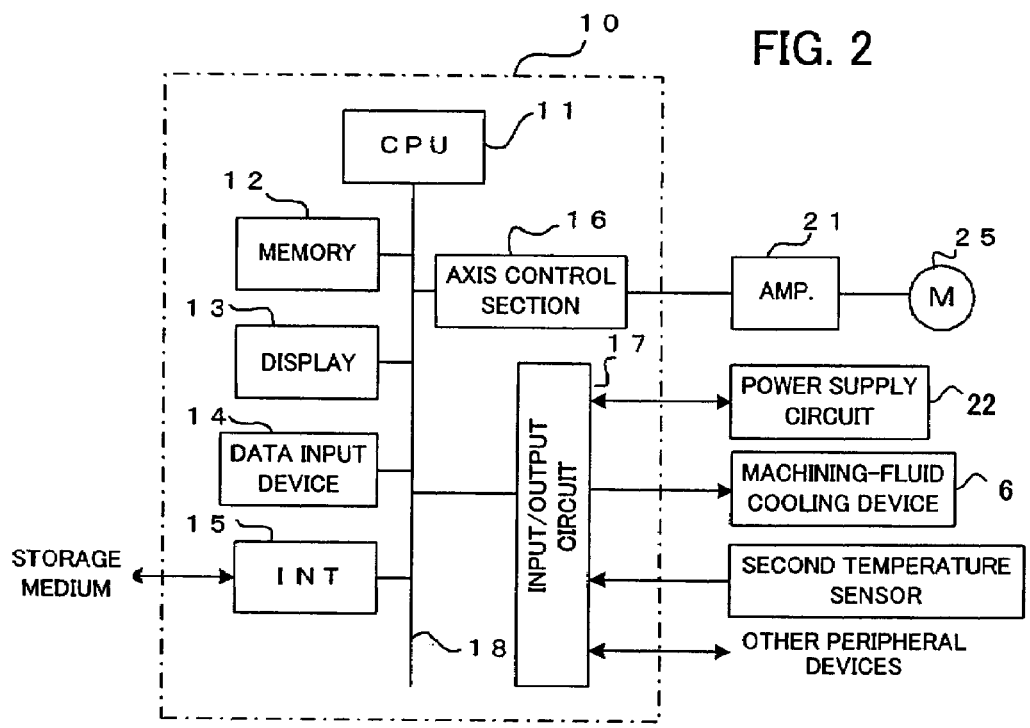
FIG. 2 is a schematic block diagram of a controller of a wire electric discharge machine according to the embodiment of the present invention.

FIG. 2 is a schematic block diagram showing a controller 10 for controlling this wire electric discharge machine. The controller 10, which can be a numerical controller or the like, comprises a processor 11, memory 12 comprised of ROM, RAM, etc. connected to the processor 11 by means of a bus 18, a display device 13, a data input device 14 such as a keyboard, an interface 15 for transferring machining programs and the like from or to an external storage medium, an axis control section 16, an input/output circuit 17, etc.

The axis control section 16 controls motors for driving X and Y axes which move the table with the workpiece mounted on in the X-axis and Y-axis directions perpendicular to each other, a Z axis which moves the upper guide in the direction perpendicular to the X and Y axes, and U and V axes for taper machining perpendicular to each other. The axis control section 16 includes means for feedback-controlling position, speed and electrical current for each axis. The axis control section 16 is connected to a servo amplifier 21 for each axis, which is connected to a servomotor 25 for each axis. Each servomotor is provided with a position-speed detector, and designed to feed the detected position and speed back to its associated axis control circuit, although not shown in FIG. 2.

To the input/output circuit 17, a power supply circuit 22 for applying a voltage between the wire of the wire electric discharge machine and the workpiece to produce electric discharges, and the machining-fluid cooling device 6 are connected. Also the second temperature sensor S2 is connected so that the detected temperature fed from the second temperature sensor S2 is converted into a digital signal by an A/D converter (analog/digital converter) included in the input/output circuit 17. To the input/output circuit 17, other peripheral devices such as sensors and actuators are also connected.

Figure 3:
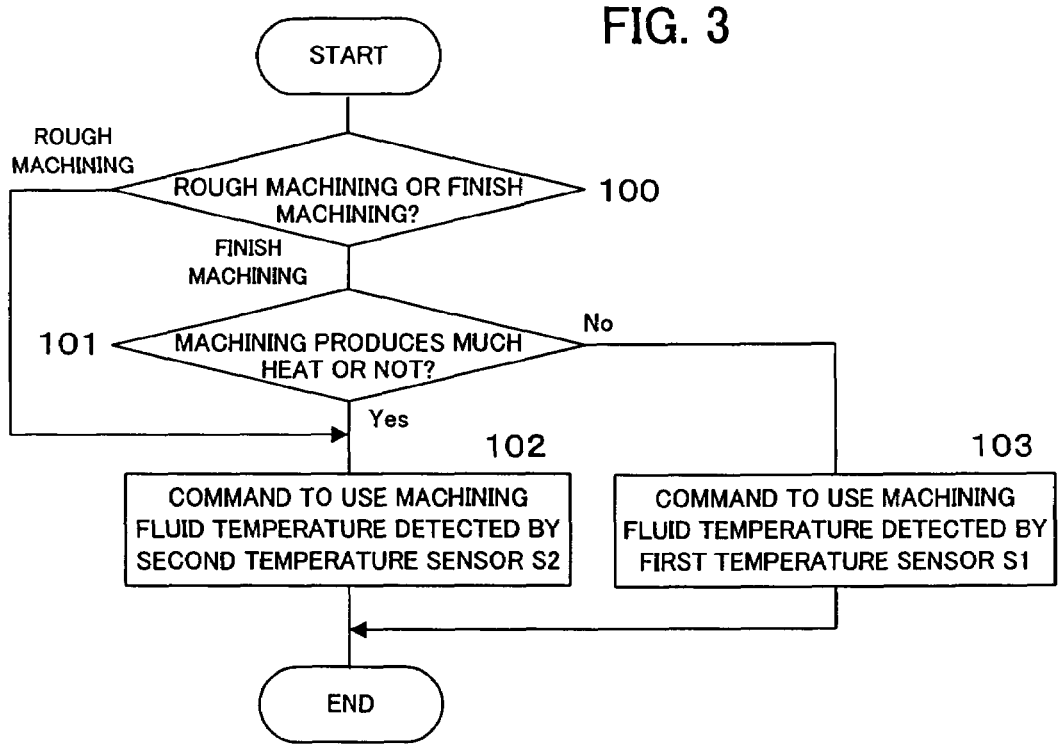
FIG. 3 is a flow chart showing an algorithm for choosing a temperature sensor in a first embodiment of the present invention.

FIG. 3 is a flow chart showing an algorithm for choosing a temperature sensor, performed by the processor of the controller 10 in a first embodiment of the present invention. In the first embodiment, a temperature sensor is selected depending on the machining conditions of electric discharge machining. In the present example, depending on whether the machining is rough machining or finish machining, and if the machining is finish machining, further depending on whether the machining produces much heat or not, a signal from the first temperature sensor S1 or a signal from the second temperature sensor S2 is selected for use as a machining-fluid temperature feedback signal in temperature control by the machining-fluid cooling device 6.

This processing is performed when a rough machining command or a finish machining command is read from a machining program. First, the processor determines whether the command read is a rough machining command or a finish machining command (Step 100). If it is a rough machining command, the processor commands the machine-fluid cooling device 6 to perform temperature feedback control on the basis of the machining-fluid temperature in the machining tank 2 detected by the second temperature sensor S2 (Step 102). The machine-fluid cooling device 6 performs feedback control so that the machining-fluid temperature detected by the second temperature sensor S2 follows a target temperature set in the form of a temperature feedback signal.

Meanwhile, if the command read is a finish machining command, whether or not much heat is produced is determined from the machining conditions set (Step 101). Whether or not much heat is produced is determined, for example on the basis of the flow rate of the machining fluid spouted from the nozzles of the upper and lower guides 5, set as a machining condition. When the amount of machining is greater and therefore the amount of heat produced is greater, the flow rate of the machining fluid spouted from the nozzles is set to a greater value. Thus, when the value set for the flow rate of the machining fluid is greater than or equal to a determined value, it is determined that much heat is produced. Alternatively, whether the finish machining produces much heat or not may be determined on the basis of no-load voltage set as a machining condition. If it is determined that much heat is produced, the processor commands the machine-fluid cooling device 6 to perform temperature control using the machining-fluid temperature detected by the second temperature sensor S2, as in the case of rough machining (Step 102). If it is determined that little heat is produced, the processor commands the machine-fluid cooling device 6 to perform temperature feedback control using the machining-fluid temperature detected by the first temperature sensor S1 (Step 103). Consequently, the machine-fluid cooling device 6 performs cooling control on the basis of the machining-fluid temperature in the clean-fluid tank 4 detected by the first temperature sensor S1.

As described above, in the rough machining and also in the finish machining producing much heat, the machining-fluid temperature in the machining tank 2 detected by the second temperature sensor S2 is selected so that the machine-fluid cooling device 6 performs feedback control for cooling the machining fluid, on the basis of the machining-fluid temperature in the machining tank 2, and in the finish machining producing little heat, the machining-fluid temperature in the clean-fluid tank 4 detected by the first temperature sensor S1 is selected so that the machine-fluid cooling device 6 performs feedback control for cooling the machining fluid, on the basis of the machining-fluid temperature in the clean-fluid tank 4. Consequently, as shown in FIG. 5, even when the machining conditions are changed between rough machining and finish machining, the machining-fluid temperature in the machining tank 2 is controlled to be maintained at the target temperature.

It is to be noted that the first embodiment may be modified by removing the determination at Step 101, such that in the rough machining, the second temperature sensor S2 is selected, and in the finish machining, the first temperature sensor S1 is selected, for the machining-fluid cooling device 6 to rely on.

Further, since the rough machining produces much heat, it may be modified by removing the determination at Step 100, such that the temperature sensor on which the machining-fluid cooling device 6 relies is selected only by the determination at Step 101. In this case, it can be arranged such that when the machining conditions are changed, whether or not the changed machining conditions produce much heat (for example, whether or not the changed flow rate of the machining fluid spouted from the nozzles is great) is determined to select a temperature sensor.

Figure 4:
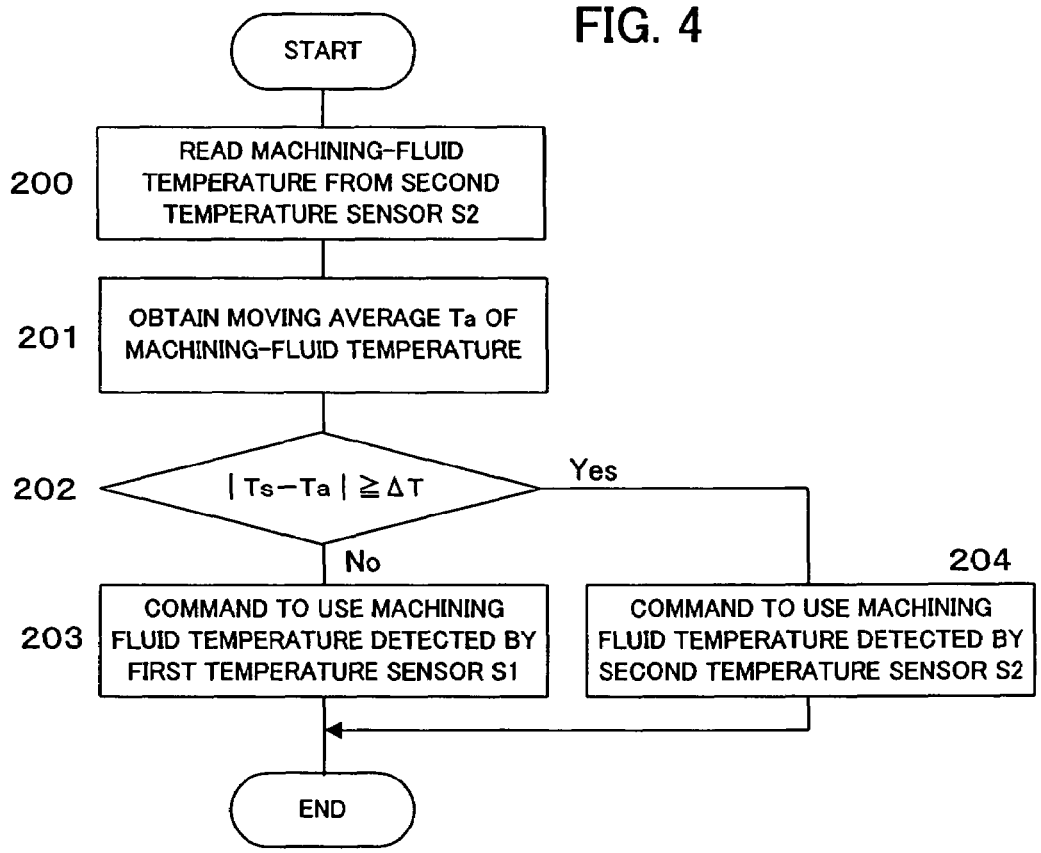
FIG. 4 is a flow chart showing an algorithm for choosing a temperature sensor in a second embodiment of the present invention.

FIG. 4 is a flow chart showing an algorithm for choosing a temperature sensor, performed by the processor of the controller 10 in a second embodiment of the present invention. In the second embodiment, the temperature sensor to be relied on in the temperature control by the machining-fluid cooling device 6 is selected depending on whether or not the difference between the temperature of the machining fluid in the machining tank 2 and the target temperature is greater than or equal to a determined value. Thus, in the second embodiment, output of the second temperature sensor S2 is fed also to the controller 10 as indicated in dashed line in FIG. 1.

While the wire electric discharge machine is performing electric discharge machining, the processor of the controller 10 performs the processing shown in FIG. 4 in cycles of a determined period. The processor reads the temperature of machining fluid outputted from the second temperature sensor S2 for detecting the temperature of the machining fluid in the machining tank 2 (Step 200), and obtains a moving average Ta of this machining-fluid temperature (Step S201). The processor determines whether or not the absolute value of a difference (temperature difference) between the target temperature Ts set for the machining fluid and the moving average Ta is greater than or equal to a determined value $\Delta T$ ($|Ts-Ta| \geq \Delta T$) (Step 202). When the absolute value is less than the determined value T$\Delta$, the processor commands the machining-fluid cooling device 6 to perform temperature control using the output of the first temperature sensor S1 (machining-fluid temperature in the clean-fluid tank 4) (Step 203), and when the absolute value is greater than or equal to the determined value T$\Delta$, commands the machining-fluid cooling device 6 to perform temperature control using the output of the second temperature sensor S2 (machining-fluid temperature in the machining tank 2) (Step 204).

Thus, the machining-fluid cooling device 6 performs feedback control for cooling the machining fluid, choosing the temperature sensor for detecting the machining-fluid temperature, depending on the difference between the machining-fluid temperature in the machining tank 2 and the target temperature. Consequently, as shown in FIG. 5, even when the machining conditions are changed between rough machining (producing a great difference between the machining-fluid temperature in the machining tank 2 and the target temperature) and finish machining (producing a small difference between the machining-fluid temperature in the machining tank 2 and the target temperature), the machining-fluid temperature in the machining tank 2 is controlled uniformly to be maintained at the target temperature.

What is claimed is:

1. A wire electric discharge machine for performing electric discharge machining according to machining conditions, having a machining tank in which the electric discharge machining is performed, a contaminated-fluid tank storing machining fluid collected from the machining tank, a clean-fluid tank storing machining fluid sent from the contaminated-fluid tank through a filter and a machining-fluid supply line for supplying the machining fluid from the clean-fluid tank to upper and lower wire guides in the machining tank, said wire electric discharge machine comprising:

a machining-fluid cooling device for cooling the machining fluid from the clean-fluid tank and supplying the cooled machining fluid to the clean-fluid tank;

first temperature detecting means for detecting temperature of the machining fluid in the clean-fluid tank;

second temperature detecting means for detecting temperature of the machining fluid in the machining tank; and selecting means for selecting one of said first temperature detecting means and said second temperature detecting means in dependence on the machining conditions, wherein said machining-fluid cooling device controls the cooling of the machining fluid based on a target temperature and the temperature detected by the selected one of said first temperature detecting means and said second temperature detecting means.

2. A wire electric discharge machine according to claim 1, wherein said selecting means selects said first temperature detecting means when performing finish machining, and selects said second temperature detecting means when performing rough machining.

3. A wire electric discharge machine according to claim 1, wherein said selecting means selects said first temperature detecting means if a set value of a flow rate of the machining fluid to be spouted from nozzles at the upper and lower wire guides is not greater than a predetermined value when performing finish machining, and selects said second temperature detecting means when performing rough machining and if the set value of the flow rate of the machining fluid is greater than the predetermined value when performing the finish machining.

4. A wire electric discharge machine according to claim 1, wherein said selecting means selects said first temperature detecting means if a set value of the flow rate of the machining fluid to be spouted from nozzles at the upper and lower wire guides is not greater than a predetermined value, and selects said second temperature detection means if the set value of the flow rate is greater than the predetermined value.

5. A wire electric discharge machine having a machining tank in which the electric discharge machining is performed, a contaminated-fluid tank storing machining fluid collected from the machining tank, a clean-fluid tank storing the machining fluid sent from the contaminated-fluid tank through a filter, a machining-fluid supply line for supplying the machining fluid from the clean-fluid tank to upper and lower wire guides in the machining tank, said wire electric discharge machine comprising:

a machining-fluid cooling device for cooling the machining fluid from the clean-fluid tank and supplying the cooled machining fluid back to the clean-fluid tank;

first temperature detecting means for detecting temperature of the machining fluid in the clean-fluid tank;

second temperature detecting means for detecting temperature of the machining fluid in the machining tank; and selecting means for selecting said first temperature detecting means when a difference between a target temperature and an average of the temperature detected by said second temperature detecting means is within a predetermined range, and selecting said second temperature detecting means when the difference is not within the predetermined range, wherein said machining-fluid cooling device controls the cooling of the machining fluid based on the target temperature and the temperature detected by the selected one of said first temperature detecting means and said second temperature detecting means.

* * * * *

UNITED STATES PATENT AND TRADEMARK OFFICE
CERTIFICATE OF CORRECTION

PATENT NO. : 7,465,899 B2  Page 1 of 1
APPLICATION NO. : 11/802904
DATED : December 16, 2008
INVENTOR(S) : Yuki Kita et al.

It is certified that error appears in the above-identified patent and that said Letters Patent is hereby corrected as shown below:

Column 1, Line 7, change "2007," to --2006,--.

Column 5, Line 6, before "flow rate" change "the" to --a--.

Column 8, Line 20, change "position-speed" to --position speed--.

Column 10, Line 2, change "(Step S201)." to --(Step 201).--

Signed and Sealed this

Twenty-fourth Day of March, 2009

JOHN DOLL
*Acting Director of the United States Patent and Trademark Office*